Nov. 18, 1930.  A. H. TRAGESER ET AL  1,782,373
METHOD OF WELDING COPPER BOILER HEADS
Filed Oct. 29, 1929

INVENTORS
Albert H. Trageser
Louis Hassinger
BY Munn & Co.
ATTORNEYS

WITNESSES

Patented Nov. 18, 1930

1,782,373

UNITED STATES PATENT OFFICE

ALBERT H. TRAGESER AND LOUIS HASSINGER, OF NEW YORK, N. Y., ASSIGNORS TO JOHN TRAGESER STEAM COPPER WORKS, OF MASPETH, NEW YORK, A CORPORATION OF NEW YORK

METHOD OF WELDING COPPER-BOILER HEADS

Application filed October 29, 1929. Serial No. 403,333.

This invention relates to an improved method of securing the heads of copper boilers to the side walls or shell by a combination of welding and brazing, the object being to provide an improved method and a finished product which are equal or superior to methods and products heretofore produced.

Another object of the invention is to provide an improved method wherein the parts are so positioned that a brazing material may be held in proper position to coact with a welding spear used in burning down part of the metallic copper of the boiler shell while the brazing material is being melted and forced into its brazing position.

A further object, more specifically, is to provide an improved copper boiler formed with combined welded and brazed ends having substantially the strength of a welded joint with the usual water and steam-tightness produced by brazing.

In the accompanying drawing,—

Referring to the accompanying drawings by numerals, 1 indicates the body or shell of a boiler, and 2 the upper end. The lower end may be welded in the same way or may be otherwise secured in place. In fact, the method of welding may be used in any place where there is provided a shell 1 and an end 2 of copper.

Figure 1:
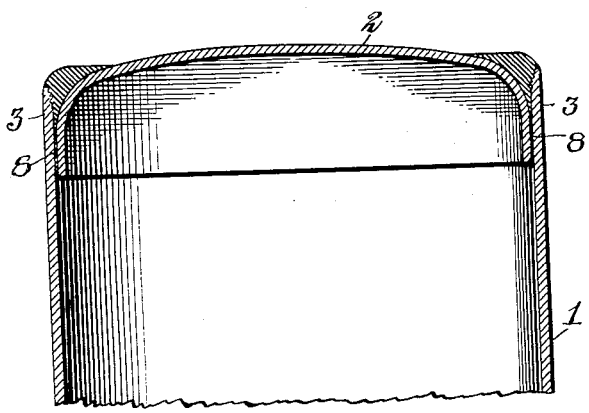
Figure 1 is a longitudinal vertical sectional view through the upper part of the boiler showing the combined brazed and welded joint formed according to the present invention.
Figure 2:
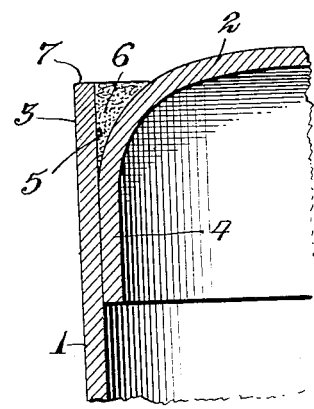
Figure 2 is a fragmentary sectional view similar to Figure 1 but showing the parts before the welding and brazing operations.
Figure 3:
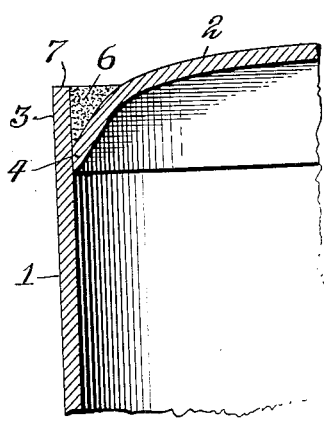
Figure 3 is a view similar to Figure 2 but disclosing a modified form of the invention.
Figure 4:
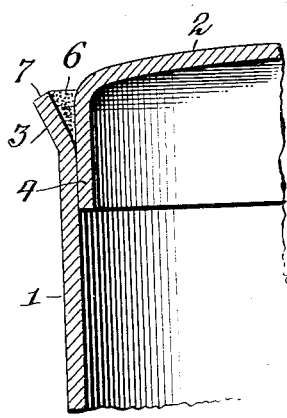
Figure 4 is a sectional view through the second modified form of the invention.

As illustrated in Figure 2, the end 2 extends downwardly into the shell 1, so that a flange 3 will be left and the circular portion 4 of end 2 will fit flatwise against the shell 1. In our Patent No. 1,733,922 a method was used whereby a flange similar to flange 3 was melted or burnt down and the tubular portion 4 was melted, as well as that section of boiler 1 adjacent portion 4. This produced a complete welded joint and resulted in a highly satisfactory product. However, in securing the desired result it was necessary to take great care that the copper was of the same grade, thickness, etc. and also it was necessary for a highly skilled workman to perform the welding operation, as otherwise holes would be burnt in the parts, or some other objectionable occurrence would take place.

In the present invention less heat is necessary to secure perfect results. As shown in Figure 2, the arrangement of end 2 and flange 3 results in a pocket or groove 5, and this pocket or groove is filled or partly filled with a brazing spelter or other material. The ordinary brazing spelter now on the market is made of a mixture of brass and zinc and does not form any part of the present invention, except in its use in combination with the other parts. After the parts have been arranged as shown in Figure 2, a welding spear is applied to the edge of flange 3, and this edge is melted or burned down for a short distance and at the same time the spelter is heated, so that melted spelter and melted copper will merge together, and in addition, some of the spelter will move down and form a welded joint between the tubular portion 4 and shell 1. In this combined brazing and welding action the welding spear is preferably moved at the same speed set forth in our patent above-mentioned, but the temperature applied at any given time is much less, usually approximately 1200° F. This temperature may be used as only the upper part of the flange is melted, and the remaining parts are only brought to a cherry red heat, except the spelter which is, of course, melted. The spelter placed on top of the head, or rather in the pocket 5, also serves to protect the head 2 from the direct heat of the flame and practically eliminates all possibilities of burning a hole in the shell or head. In this connection it will be noted that usually the head is thicker than the shell and is not melted due to this fact, and also that it is greater in area, and consequently, radiates and dissipates more heat than the small section forming the vertically-extending flange 3. However, the adjacent parts of the shell and head with the contact area between the shell and head are sufficiently porous to absorb the liquid or molten spelter, so that the three elements are forced into one non-porous pressure-tight joint. This formation of joint is particularly advantageous in case a blow hole should develop, as it makes it possible to make repairs by use of an acetylene torch and brazing wire which will melt before the copper head will melt, and consequently, will run into the hole similar to soft solder and will thereby make the parts water-tight. The entire arrangement and advantages are secured through the use of a flange of any kind which projects upwardly or away from the head so as to produce a pocket in which the spelter may be placed during the welding and brazing operation.

What we claim is:—

1. The method of welding and brazing the head on a copper boiler, consisting in fitting the head into the end portion of the shell and boiler, so that part of the shell of the boiler will project beyond the head, supplying a quantity of spelter solder in the pocket provided between the projecting portion of the shell and the head, and then applying heat by an electric torch to the portion of the shell projecting beyond the head, said torch being maintained in position until a large part of the projecting portion of the shell is melted and all of the solder melted and caused to merge into one substantially homogeneous mass with the edge portion of the shell and the edge portion of the head.

2. The method of welding and brazing copper boiler heads, consisting in mechanically positioning a copper boiler head near the end of the shell of the boiler and in such a position that the extreme end of the shell of the boiler will present a flange projecting beyond the head to be welded and brazed in place, applying a quantity of brazing in the pocket between said flange and the head, and then applying an electric torch to said flange and moving the same along the flange as it is melted, the temperature and speed of the welding implement being such as to cause said flange to melt for approximately half its height and to cause the adjacent spelter to melt and move into a homogeneous mass with the melted flange and to penetrate into the pores of the shell and head.

3. The method of welding and brazing the head of a copper boiler to the shell, consisting in assembling the head and shell so that there will be an integral projection extending from the point of contact of the two members and a pocket adjacent the point of contact, substantially filling said pocket with brazing spelter, and then applying heat to said projection sufficiently high in temperature to melt the projection and the spelter in said pocket, said heat being maintained until part of the projection is melted and all of the spelter is melted.

4. The method of welding and brazing the head of a copper boiler to the shell and producing a water-tight and non-porous joint, consisting in mechanically fitting the head to the shell, so that there will be a projection from one of the parts integral therewith and a pocket adjacent said projection, supplying a layer of brazing spelter to said pocket, and then applying heat to said projection until a portion thereof has been melted and all of said spelter has been melted.

ALBERT H. TRAGESER.
LOUIS HASSINGER.